United States Patent [19]

Sobotta

[11] 4,106,867
[45] Aug. 15, 1978

[54] SLIDE PROJECTOR FOR BOTH MAGAZINE AND SINGLE SLIDE PROJECTION

[75] Inventor: Reinhard Sobotta, Braunschweig, Mascherode, Fed. Rep. of Germany

[73] Assignee: Rollei-Werke Franke & Heidecke, Brunswick, Fed. Rep. of Germany

[21] Appl. No.: 829,083

[22] Filed: Aug. 30, 1977

[30] Foreign Application Priority Data

Sep. 8, 1976 [DE] Fed. Rep. of Germany ... 7627989[U]

[51] Int. Cl.² ............................................. G03B 21/00
[52] U.S. Cl. ..................................... 353/114; 353/122
[58] Field of Search ............... 353/104, 103, 116, 114, 353/118, 122

[56] References Cited

U.S. PATENT DOCUMENTS

| | | | |
|---|---|---|---|
| 2,895,242 | 7/1959 | Wiklund | 353/114 X |
| 2,990,750 | 7/1961 | Zillmer | 353/114 |
| 3,115,811 | 12/1963 | Mulch | 353/116 X |
| 3,532,421 | 10/1970 | Schlessel | 353/116 |

FOREIGN PATENT DOCUMENTS 1,165,943  6/1958  France ...................................... 353/116

Primary Examiner—Harry N. Haroian
Attorney, Agent, or Firm—Stonebraker, Shepard & Stephens

[57] ABSTRACT

A magazine-type slide projector has a single slide projection accessory that is removably placeable across the magazine track. The accessory has a slide compartment positioned on the slide changing plane, and the compartment has an open top edge and an open side edge facing the slide projection position. The accessory allows manual insertion and removal of single slides through the top opening of the compartment for movement of the slides into and out of the slide projection position by the slide changing device. The projector also preferably has a storage compartment where the accessory can be conveniently stored when not in use.

5 Claims, 4 Drawing Figures

SLIDE PROJECTOR FOR BOTH MAGAZINE AND SINGLE SLIDE PROJECTION

BACKGROUND OF THE INVENTION

The invention relates to a slide projector for consecutively projecting slides from a magazine and for alternatively projecting single slides not contained in a magazine. A known magazine slide projector of this type has a slot in the projector housing directly above the projection gate so that a single slide can be inserted through the slot and into the projection gate without using the slide changing device. This requires removal of a frame that is slidable within the housing with movement of the slide changing device and later repositioning of the frame, and this makes single slide projection awkward, inconvenient, and time consuming.

The invention aims at a simpler and more convenient way of converting a magazine slide projector for single slide projection. The invention also aims at economy and reliability in a simple and practical device making single slide projection relatively easy.

SUMMARY OF THE INVENTION

The invention applies to a slide projector having a device for changing slides in and out of a slide projection position along a slide changing plane to and from a magazine held in a magazine track. It includes a single slide projection accessory that is configured to be removably placeable in the region of the magazine track. The accessory is configured to form a slide compartment positioned on the slide changing plane when the accessory is placed in the magazine track, and the compartment has an open top edge and an open side edge facing the slide projection position. The accessory then provides means for manual insertion and removal of single slides through the top opening of the compartment for movement into and out of the side projection position by the slide changing device. The accessory preferably has a mounting or front plate and two parallel guide plates extending vertically outward from the front plate and spaced apart enough to receive one slide between the guide plates. A magazine guide wall extending along the magazine track preferably has a recess for releasably receiving and holding the front plate to position the compartment of the accessory on the slide change plane. The projector also preferably has a storage chamber for storing the accessory so that the guide plates extend into the storage chamber and the front plate closes the chamber and is positioned flush with a projector surface.

DRAWINGS

DETAILED DESCRIPTION

Figure 1:
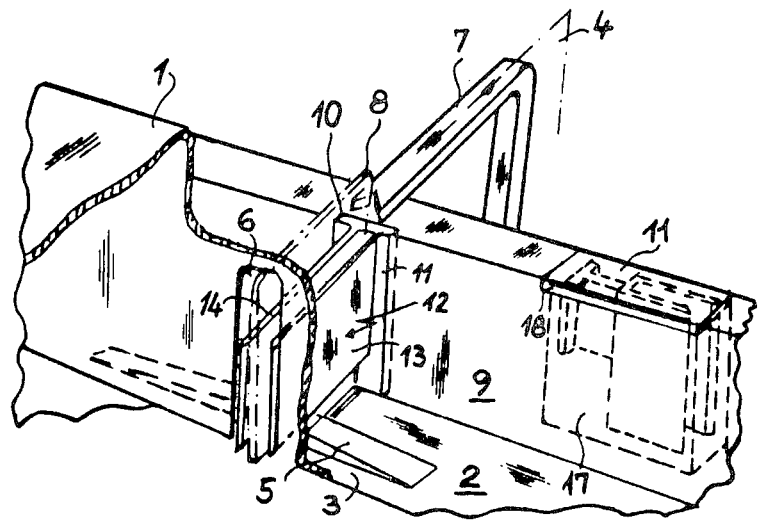
FIG. 1 is a fragmentary perspective view of a preferred embodiment of the inventive slide projector showing only the parts that are essential for understanding the invention.

In the slide projector fragment shown in FIG. 1, housing 1 encloses a projection unit and components for a slide changing device 7. A generally U-shaped magazine guide 2 runs parallel with the light projection path alongside housing 1, an one side wall of the magazine track is formed by housing 1. The bottom of the magazine guide forms a magazine track 3 having a slide lifting ramp 5 that raises slides upward as they move into the slide changing plane 4. Housing 1 has a slot through which a slide 8 can be moved along the slide changing plane 4 into the slide projection position within the housing. The slide changing device 7 moves slide 8 into and out of the projection position, and a magazine arranged in magazine guide 2 can provide a sequence of slides for consecutive projection. In the illustration of FIG. 1, no magazine is in the magazine guide 2, and the projector is converted to optional single slide projection.

Figures 2, 3:
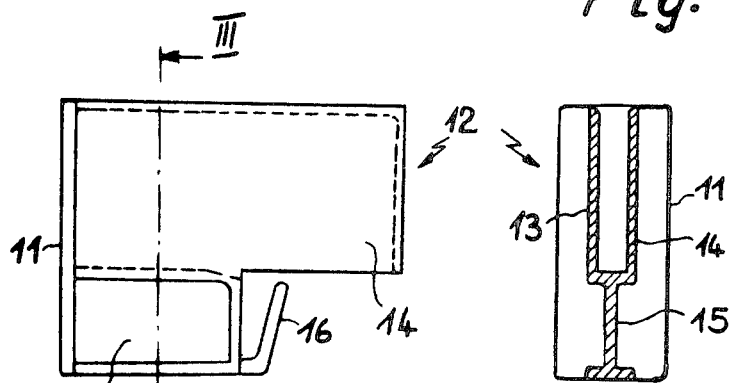
FIG. 2 is a side elevational view of a preferred embodiment of a single slide projection accessory according to the invention.
FIG. 3 is a cross sectional view of the accessory of FIG. 2 taken along the line III—III thereof.
Figure 4:
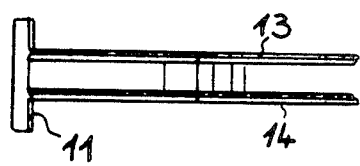
FIG. 4 is a plan view of the accessory of FIG. 2.

A single slide projection accessory 12 has a mounting or front plate 11 that fits snugly in a recess 10 in magazine guide wall 9 for releasably receiving and holding accessory 12 in the magazine guide in a position on the slide changing plane. Accessory 12 is manually slidable into recess 10 where it has a snug fit securing it in place for single slide projection. The details of accessory 12 are best shown in FIGS. 2-4.

A pair of guide plates 13 and 14 extend vertically outward from front plate 11 and are spaced apart enough to receive a single slide, so that guide plates 13 and 14 form opposite side walls of a slide compartment for accessory 12. The compartment between guide plates 13 and 14 is open along a top edge and along a side edge facing toward the interior of the projector and the slide projection position. Guide plates 13 and 14 extend to the top of front plate 11, and extend downward to the top of slide lifting ramp 5 when the front plate is fully seated in recess 10.

Beneath the guide plates is a web 15 extending from the guide plates downward to the bottom of front plate 11 and extending outward from front plate 11 under the guide plates toward the slide lifting ramp. Slide 8 in the compartment between guide plates 13 and 14 rests on the top of web 15 and the top of slide lifting ramp 5, and the bottom of web 15 is widened to form a foot resting on the magazine track 3 when the accessory 12 is positioned as shown in FIG. 1. A resilient element 16 extends outward from web 15 for resiliently engaging the side of the lifting ramp 5 to help secure accessory 12 firmly in place. Front plate 11, guide plates 13 and 14, and web 15 are preferably all formed integrally, and if accessory 12 is molded of plastics material, resilient element 16 can be injection molded at the same time.

To operate the accessory 12, the magazine guide is cleared of any magazine, and front plate 11 is pushed down into recess 10 manually to position accessory 12 across the magazine guide 2 as shown in FIG. 1. Slide 8 can then be manually dropped in between guide plates 13 and 14, and then the slide change device is operated in the usual way to push the slide into and out of the projector for single slide projection. This can be repeated as often as desired. When single slide projection is finished, accessory 12 is removed from slot 10 and projection can continue from a magazine positioned in the magazine guide.

As this happens, it is convenient to store the accessory somewhere in the projector so that it is readily available for its next use. The preferred storage for accessory 12 is inside the magazine guide wall 9 as best shown in FIG. 1. A storage chamber 17 is formed within magazine guide wall 9 and has a top opening 18 near the top of wall 9. The storage chamber and its top opening are configured relative to the accessory so that the guide plates 13 and 14 of the accessory extend downward into the storage chamber, and front plate 11 closes the top opening and seats flush with the top of guide wall 9. Front plate 11 is preferably the same width as guide wall 9 so that it has a neat flush fit and can be grasped by a thumb and finger for removing the accessory from the storage chamber.

What is claimed is:

1. A photographic slide projector comprising means forming a magazine channel for guiding a slide magazine for movement to bring successive slides thereof to a slide changing plane, said guiding means including a magazine guide wall, a slide lifting ramp for lifting successive slides in the magazine as they approach the slide changing plane, a slide changing device for moving successive individual slides from the slide magazine to a projection position and back from projection position into the slide magazine, and an accessory for holding a single slide in position to be moved by the same slide changing device into projection position and back again to the accessory when it is preferred to project single slides rather than slides from a magazine, said accessory comprising a front plate and walls collectively forming a compartment for holding a single slide, said compartment being shaped to be placed crosswise in said magazine channel at said slide changing plane, said compartment having a top edge which is open for manual insertion and removal of single slides and having a side edge facing said projection position which is open for movement of a slide out of and into said compartment to and from projection position by action of said slide changing device, said magazine guide wall of said projector having a recess for releasably receiving and holding said front plate of said accessory to position said compartment on said slide changing plane, said accessory further including a resilient element for resiliently engaging a side of said lifting ramp when said front plate is seated in said recess.

2. The slide projector of claim 1 wherein said front plate, said guide plates, and said web are formed integrally.

3. The slide projector of claim 1 configured to form a storage chamber for said accessory, said chamber being arranged so that when said accessory is in said chamber said front plate closes said chamber and is flush with a surface of said projector.

4. The slide projector of claim 3 wherein said chamber is formed in said magazine guide wall to open at the top of said magazine guide wall.

5. The slide projector of claim 4 wherein said front plate has the same width as said magazine guide wall and is flush with the top of said magazine guide wall when said accessory is stored in said chamber.

* * * * *